United States Patent

Levy et al.

Patent Number: 5,313,041
Date of Patent: May 17, 1994

[54] METHOD OF VOLTAGE MEASUREMENT OVER THE WELDING SEAM IN A ROLLER HEAD WELDING MACHINE AND DEVICE FOR PERFORMING THE METHOD

[75] Inventors: Gideon Levy, Orselina; Peter Baessler, Bellikon; Theodor Lachmuth, Urdorf, all of Switzerland

[73] Assignee: Elpatronc AG, Zug, Switzerland

[21] Appl. No.: 33,048

[22] Filed: Mar. 18, 1993

[30] Foreign Application Priority Data

Apr. 24, 1992 [CH] Switzerland ............ 01330/92-3

[51] Int. Cl.$^5$ .............................................. B23K 11/25
[52] U.S. Cl. ........................................ 219/109; 219/81
[58] Field of Search ..................... 219/109, 110, 81

[56] References Cited

U.S. PATENT DOCUMENTS

| 4,449,028 | 5/1984 | Buxton | 219/109 |
| 4,714,816 | 12/1987 | Pazzaglia | 219/109 |
| 4,939,335 | 7/1990 | Mueller | 219/109 |
| 5,171,961 | 12/1992 | Corton et al. | 219/109 |

FOREIGN PATENT DOCUMENTS

| 0014271 | 8/1980 | European Pat. Off. . |
| 0373422 | 6/1990 | European Pat. Off. . |
| 0465038 | 1/1992 | European Pat. Off. . |
| 3822908 | 8/1991 | Fed. Rep. of Germany . |

Primary Examiner—Clifford C. Shaw
Attorney, Agent, or Firm—McCormick, Paulding & Huber

[57] ABSTRACT

The measurement of the voltage over the welding point in order to supervise the welding quality takes place by means of voltage taps on the wire electrodes. As a result, the additional parasitic resistances during measurement by means of conventional voltage taps on the roller head or the roller head mounting are completely eliminated, which improves the measuring accuracy.

8 Claims, 1 Drawing Sheet

METHOD OF VOLTAGE MEASUREMENT OVER THE WELDING SEAM IN A ROLLER HEAD WELDING MACHINE AND DEVICE FOR PERFORMING THE METHOD

BACKGROUND OF THE INVENTION

The invention relates to a method of measuring the voltage over the welding seam in a roller head welding machine or spot welding machine with wire electrodes. The invention furthermore relates to a device for carrying out the process.

It is known to monitor the quality of electrical welds, in which connection reference may be made to European Patent Application No. 373 422. Such a device in particular requires measurement of the voltage over the welding seam in order to control the energy input to the welding seam.

As is well known (DE-PS 38 22 908), voltage measurement takes place on the roller head mount or on the roller head. This necessitates a costly compensation of the parasitic resistances measured at the same time, which arise from contamination of the roller head, from the bearings and from the means for transmitting welding current to the roller heads.

SUMMARY OF THE INVENTION

The problem on which the invention is based is therefore to carry out voltage measurement more accurately and more simply. This is achieved in the method hereinbefore mentioned, in that the voltage is measured by voltage tapping onto the wire electrodes.

Higher measuring accuracy for measurement of the energy supply to the welding seam, and more especially no drift of the measuring signal, come as advantages of taking voltage measurements from the wire electrodes. There is also no necessity to re-calibrate the monitoring device which processes the measured voltage value. Finally, there are fewer faulty rejects of welded products by the monitoring device resulting from erroneous energy measurement.

Preferably, a voltage measurement is also made on the roller head or on the roller head mount. However now the voltage between roller head and wire electrode or between roller head mount and wire electrode is determined as an auxiliary measured voltage value. By measurement of this voltage in each case, the functional efficiency of the respective roller head can be determined, which makes it possible to adapt the appropriate maintenance interval for the roller heads. Unnecessary breaks in production can thus be avoided. Premature wear or contamination can be detected before the welding quality is negatively influenced.

The invention also includes the underlying problem of providing a measuring device for carrying out the method.

BRIEF DESCRIPTION OF THE DRAWINGS

The prior art and the invention are explained in greater detail hereinafter by reference to the drawings, in which.

BRIEF DESCRIPTION OF THE PREFERRED EMBODIMENTS

Figure 1:
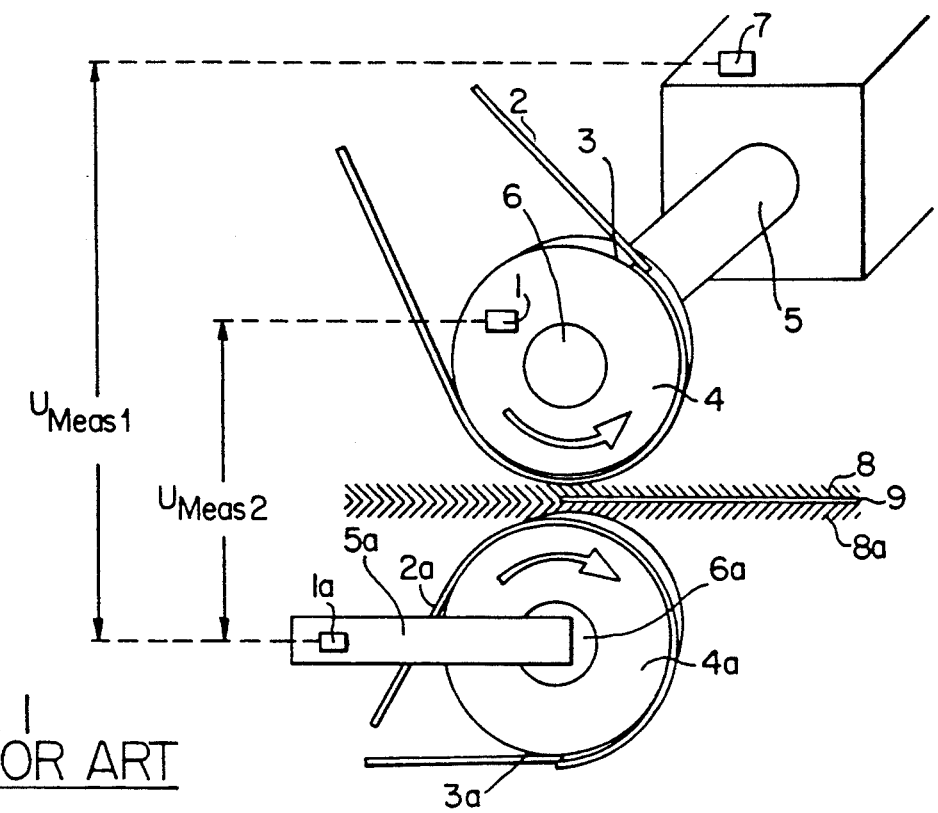
FIG. 1 shows diagrammatically the voltage measurement on the roller heads according to the prior art.

Existing solutions for energy measurement determine the voltage on the welding current supply lines or on the rotating part of the roller head. In FIG. 1 it is shown how voltage measurement is falsified by disturbing voltages in existing methods.

The measured voltage $U_{meas1}$ is the sum of the voltage drops in the components of the measuring circuit through which current flows:

$U_{meas1} = U_{dist,top} + U_{weld} + U_{dist,bottom}$
$U_{dist,top} = (R_5 + R_6 + R_4 + R_3 + R_2) \cdot I$
$U_{weld} = (R_8 + R_9 + R_{8a}) \cdot I$
$U_{dist,bottom} = (R_{5a} + R_{6a} + R_{4a} + R_{3a} + R_{2a}) \cdot I$ where in this case the top voltage tapping is located on the top roller head mount 7. The aforementioned resistances R arise from the electrical resistance of the top roller head mounting 5 ($R_5$), from the top transition 6 ($R_6$) between the mounting 5 and the roller head 4, the roller head 4 itself ($R_4$), from the transition 3 ($R_3$) between the top roller head 4 and the top wire electrode 2 and from the transition between the wire 2 and the top plate 8 ($R_2$). There is, in addition, the weld resistance made up of the resistance of the top plate 8 ($R_8$), the welding seam 9 ($R_9$) and the bottom plate 8a ($R_{8a}$). The bottom resistances $R_{2a}$, $R_{3a}$, $R_{4a}$, $R_{3a}$, $R_{2a}$ arise in a similar way to the component resistances of $U_{dist,top}$. The voltage tapping 1a is located on the bottom roller head mount 5a. I denotes the welding current. It can be seen that high additional voltages are superimposed on the measurement value $U_{meas1}$, which should really only state the voltage drop at the welding station.

In another embodiment according to the prior art, the top voltage tapping 1 takes place on the top roller head 4. The additional voltages which are superimposed on the measured voltage $U_{meas2}$ are only negligibly reduced by this arrangement. The following applies $U_{dist,top1} = (R_6 + R_4 + R_3 + R_2) \cdot I$ The resistances $R_3$ and $R_{3a}$ are particularly critical, because they continually increase during the production process and therefore cause a drift of the voltage signal. As the increase of these resistances up to a certain value has no influence on the quality of the welding, the measurement of this periodically variable additional voltage means a deterioration of the quality of the measurement and can cause the device which monitors the welding quality by means of the measurement to release false rejects (that is to say, to reject parts which are in themselves qualitatively correctly welded).

The basic concept of the present invention is not to measure at the same time the additional voltages—more especially the variable voltage drops over the resistances $R_3$ and $R_{3a}$—which interfere with the assessment of the quality of the welding seam.

Figure 2:
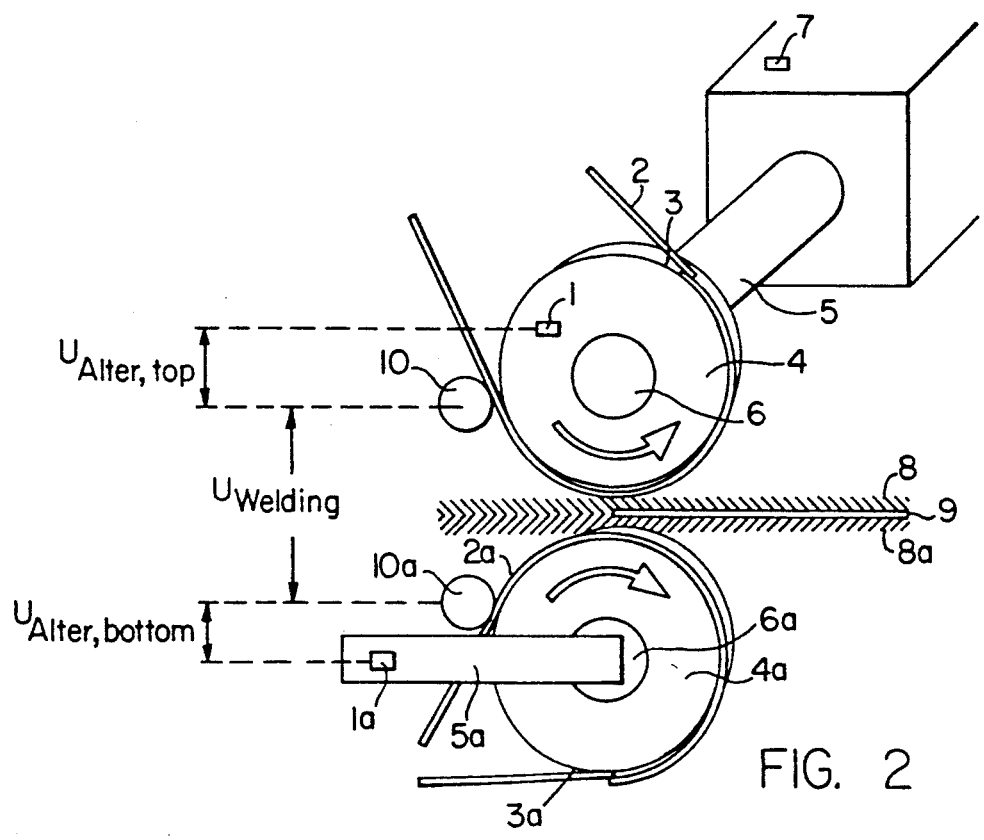
FIG. 2 shows the measurement according to the invention.

In FIG. 2 is illustrated the principle of the improved measurement arrangement. The voltage taps 10 and 10a on the welding wires 2 and 2a completely eliminate all disturbing influences from additional voltages.

Here, identical reference numbers to those in FIG. 1 denote the same elements in FIG. 2.

The voltage taps 1 (or 7) and 1a are preferably also provided on the roller heads 4 or on their mounts 5 and 5a. In this way the voltages $U_{alter,top}$ and $U_{alter,bottom}$ between the voltage taps 10 and 1 or 10a and 1a can also be measured. These voltages produce a measure of the functional efficiency of the roller heads, which can thereby be monitored during the operation of the welding machine, which hitherto has not been possible. In particular, the resistances $R_3$ and $R_{3a}$ or their variation are detected here.

In this special exemplified embodiment of the method there are obtained by way of advantages, in particular, less production stoppages through dynamic maintenance intervals, less wear of the roller head by avoidance of preventive reworking (finish turning) of the roller heads, fewer rejects because of contamination being recognised too late or damage to the roller heads, and assistance in planning maintenance of the welding machine.

The measuring device for carrying out the method has sliding contacts for the wire electrodes 2 and 2a to form the voltage taps 10 and 10a. These sliding contacts can be designed as stationary or spring-loaded sliding contacts. The measuring device preferably has further measuring channels, in order to make it possible likewise to measure the abovementioned voltages $U_{alter,top}$ and $U_{alter,bottom}$ to determine the roller head function.

We claim:

1. Method for measuring the voltage over the welding seam in a roller head welding machine or spot welding machine with first and second wire electrodes guided respectively upon first and second rollers mounted at opposite sides of a welding seam, characterized in that a welding voltage is measured by placing a first voltage tap in sliding contact with the first wire electrode; and a parasitic voltage is measured by placing a second voltage tap in contact with the first roller or mounting for the first roller guiding the first wire electrode.

2. A method for measuring the voltage over the welding seam as defined in claim 1 wherein further
the welding voltage is measured by placing a second voltage tap in sliding contact with the second wire electrode.

3. A method for measuring the voltage over the welding seam as defined in claim 2 wherein
the parasitic voltage at the second roller is measured by placing a further voltage tap in contact with the second roller or mount for the second roller guiding the second wire electrode.

4. Measuring device for measuring the voltage generated across a welding seam by the welding head of a welding machine employing two wire electrodes, guided respectively by two electrode rollers on roller mounts in the head characterized by at least one voltage-measuring means comprised by sliding contacts contacting one and another of the wire electrodes respectively, and an another voltage-measuring means comprised by one of the sliding contacting the one of the electrodes wires and a voltage tap connected to the roller or roller mount guiding the one of the electrode wires.

5. Measuring device as claimed in claim 4, characterized in that the sliding contacts are arranged as stationary contacts.

6. Measuring device as claimed in claim 4, characterized in that the sliding contacts are arranged as spring-loaded contacts.

7. Measuring device as claimed in claim 4, characterized in that a stationary sliding contact is provided for the one wire electrode and a spring-loaded sliding contact for the other wire electrode.

8. A measuring device as claimed in claim 4 characterized in that the voltage tap is a further sliding contact connected to a top roller of the welding head guiding said one of the wire electrodes; and further voltage-measuring means is comprised by the other of the sliding contacts contacting said other of the wire electrodes and a fixed contact connected with a mounting for a bottom roller of the welding head guiding said other of the wire electrodes.

* * * * *